(No Model.)  
3 Sheets—Sheet 1.
E. A. SPERRY.
ELECTRIC MINE CAR.
No. 478,138. Patented July 5, 1892.
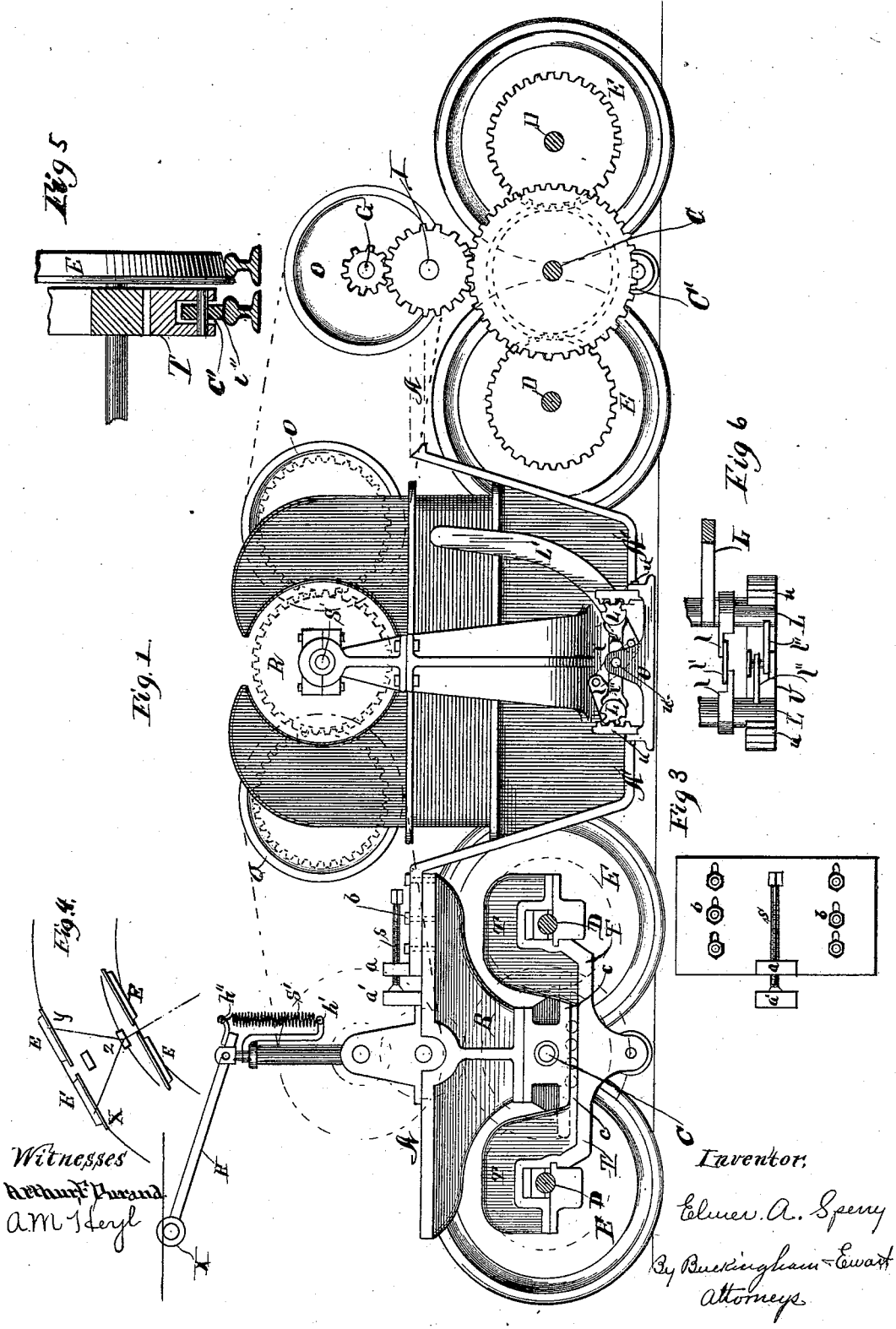

(No Model.) 3 Sheets—Sheet 2.
E. A. SPERRY.
ELECTRIC MINE CAR.
No. 478,138. Patented July 5, 1892.
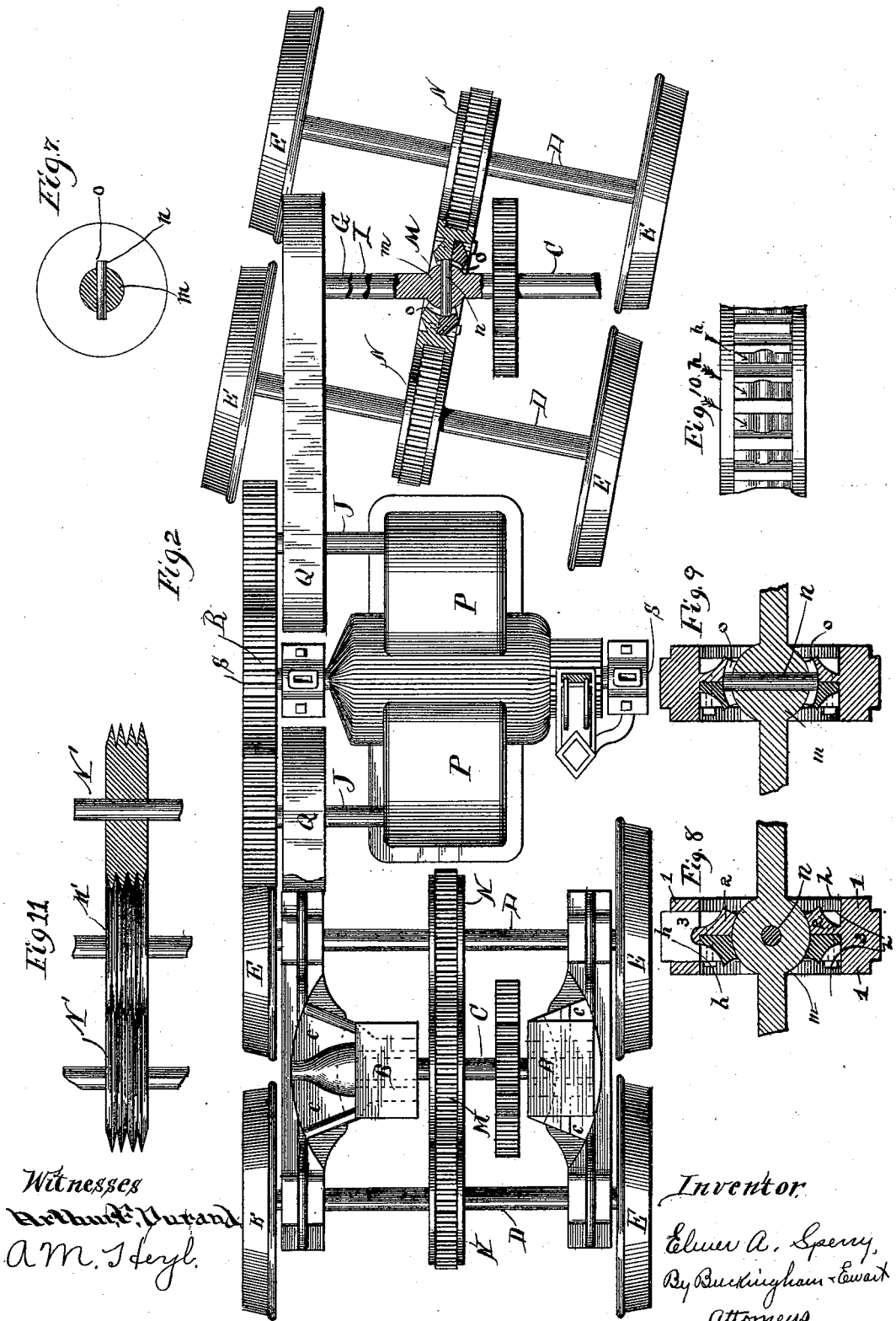

(No Model.) 3 Sheets—Sheet 3.
E. A. SPERRY.
ELECTRIC MINE CAR.
No. 478,138. Patented July 5, 1892.
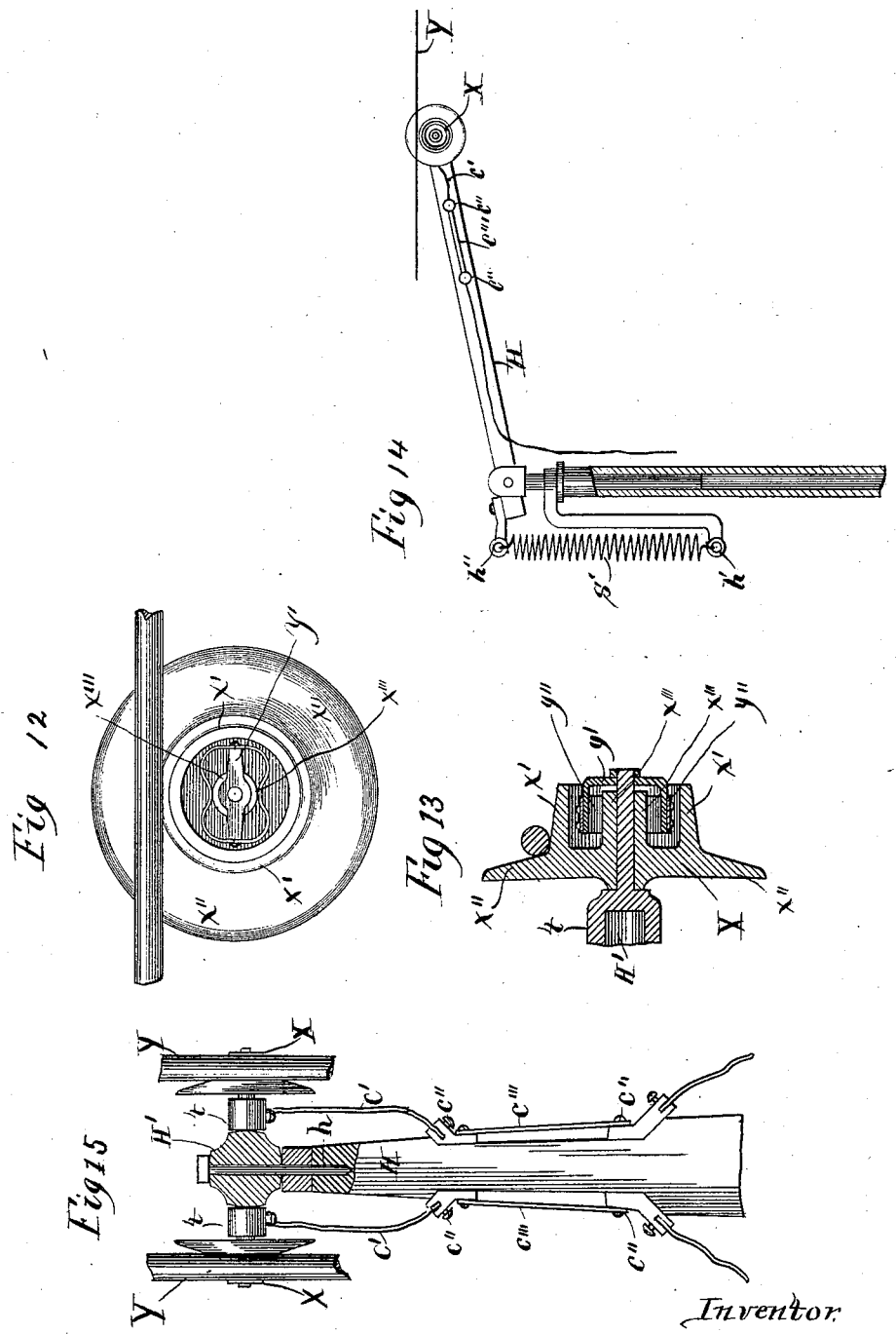

UNITED STATES PATENT OFFICE.

ELMER A. SPERRY, OF CHICAGO, ILLINOIS.

ELECTRIC MINE-CAR.

SPECIFICATION forming part of Letters Patent No. 478,138, dated July 5, 1892.

Application filed February 16, 1891. Serial No. 381,551. (No model.)

*To all whom it may concern:*

Be it known that I, ELMER A. SPERRY, a citizen of the United States, residing at Chicago, Cook county, State of Illinois, have invented certain new and useful Improvements in Motor Tram-Cars, of which the following is a specification, reference being had to the accompanying drawings, in which similar letters and numerals of reference indicate like parts in all the figures.

My improvements are used more particularly in motor tram-cars employing independent trucks, in combination with the frame, and which utilize electricity as the energizing agent, and they relate to improved means for the transmission of power from the motor to the traction-wheels on the truck and the transmission of draft between the trucks and the frame while permitting deflection of the trucks from alignment with the frame.

My improvements also relate to improved means for permitting the trucks to pass around short curves, such as are usually met with in mines, to the brake devices, and to improved trolley connections between the motor on the tram-car and fixed external conductors, and they consist in the various constructions and arrangements hereinafter described, and shown in the drawings, wherein—

Figure 1 illustrates a side view of the arrangement of the mechanism of a motor tram-car embodying my improvements, and Fig. 2 is a plan view of the same.

The other figures show various detail views of my improvements and will be fully explained hereinafter. Some of these improvements may be used without the others and in different apparatus from that shown herein.

In the figures, A' A A' is the frame having the stirrup-shaped depression in the middle for the support of the motor, the object of this arrangement being to render the tram-car of minimum possible height.

The armature-shaft S' of the motor is connected by gears both ways to the pulley-wheels Q Q, mounted on the gudgeons J J, fixed in the pole-pieces of the motor, and in frictional driving connection with the shafts V V, mounted on the frame over the trucks and bearing the pulleys Q'. In the drawings I have shown this frictional driving connection as consisting of a belt. I do not limit myself, however, to this mode of construction, but may use any form of frictional power-transmitting device adapted to the purpose. In order to adjust the tension of this frictional driving connection, I make the frame separable between the part A, carrying the pulleys Q, and the end parts A', carrying the shafts V and pulleys Q', and adjustably connect these parts by means of bolts $b$, passing through slotted holes in the part A into the parts A'. (Shown vertically at the left in Fig. 1 and horizontally in Fig. 3.) The parts are also provided with the lugs $a'$ and $a$, with the screw $s$ passing through one and pressing against the other, so that by loosening the bolts $b$ the parts A' and A of the frame may be adjusted longitudinally one with the other by means of the screw, and then by tightening the bolts $b$ the parts may be rigidly secured together, thus obtaining any desired degree of tension on the frictional driving mechanism between the pulleys.

At each end of the frame, but shown only at the left, the other being similar, depend the journal-bearing projections B, having journaled therein the transversely-disposed shaft C and provided with a foot or bearing-surface $c\ c$, adapted to rest on a bearing-surface on the equalizing-bars T T of the trucks for the support of the frame. These bearing-surfaces are preferably circular in form, having their centers at the middle point of the truck to secure the support of the frame while the truck is deflected at curves, and there is preferably disposed between them the anti-friction rollers shown in Fig. 1. The shaft C, mounted on the frame by means of the depending projections B, is located between the axles D D, which are mounted in the trucks and carry the traction-wheels E E, and is preferably in the same horizontal plane with them. The shaft C is connected with the pulleys Q' on the shafts G by a system of gears. (Shown at the right in Figs. 1 and 2.) The shaft C, mounted on the frame, carries a wheel M, mounted thereon by such connections as will permit of the rotation of the wheel by the shaft C, yet at the same time admit of variation in the angle between the axis of the shaft and the plane of rotation of the wheel.

One method of doing this is shown at the right in Fig. 2 and in Fig. 7, and consists of a spherical portion $m$, formed on the shaft C, with the wheel M, having its hub concaved spherically and adapted to fit the spherical portion of the shaft. A pin $n$ passes loosely through the spherical portion $m$ of the shaft and its projecting ends engage with meridional slots $o$, Fig. 2, in the concave surface of the hub, causing rotation of the same by the shaft, yet permitting variation in the angle between the plane of rotation of the wheel and the axis of the shaft. I do not limit myself to this particular mode of securing this action between the shaft C and the wheel M, but may use any form of universal-joint or tumbling-rod connection by which the result may be attained. The wheel M on the shaft is in engagement with the wheels N N, mounted on the axles W of the traction-wheels E E. The wheels M and N are shown in gear engagement for the transmission of power, and the gears are also provided on each side with broad housings in rolling contact at their pitch-circles for the purpose of transmitting longitudinal draft from the truck to the frame or from the frame to the truck by the radial pressure of the wheels M and N, one against the other, as illustrated in Fig. 2. Nor do I limit myself in this regard to the specific form of engaging connection between the wheels M and N. If I desire, I may use any form of contact engagement adapted to the purpose, as that shown in Fig. 11, for instance, wherein the wheels are shown as having deep V-shaped grooves on their peripheries, and which are adapted to establish a powerful frictional contact with each other. The contact between these wheels prevents any lateral movement of one with reference to the other and maintains them in alignment with each other, as will more fully appear hereinafter. In the operation of these parts power is transmitted from the armature-shaft through the frictional power-transmitting device and gears to the shaft C, which for brevity I will hereinafter designate as a "power-shaft." The power-shaft C, carrying the wheel M, transmits its rotation to the wheels N and thence to the traction-wheels, causing propulsion of the truck, which in turn propels the car by the draft which is transmitted to the frame by the radial pressure of wheel N against the wheel M, which is mounted on the shaft C borne by the car-frame. If for any reason the motor should be in driving connection with only one of the trucks, as would be the case if the bolts Q should break or be removed the wheel M on the frame within the truck out of engagement with the motor would bear against the wheel N on such truck and by its pressure draw the truck with the frame. It therefore appears that the wheel M in its location between the wheels N N is adapted by its engagement to transmit draft from the truck to the frame or from the frame to the truck. The truck in its deflection from alignment with the car-frame at a curve carries with it the wheels N N to the position shown in Fig. 2, and by their contact with the wheel M or through the lateral action of the housings on the sides of the gears, or if wheels of the form shown in Fig. 11 are used, then by the lateral pressure of the grooves the wheel M is maintained in constant alignment with the wheels N N and rotates with the shaft C at an angle therewith, which is permitted by the manner of its mounting thereon, as hereinbefore explained.

The housings on the sides of the gears M N, or whatever means I use for maintaining their alignment, prevent transverse movement of the truck and enable me to utilize the pivotal mounting of the wheel M on the shaft C as the pivotal connection between the truck and the frame, providing for the support of the weight of the frame on the truck by the bearing-surfaces $c$ $c$.

The hereinbefore-described mechanism for permitting the deflection of the trucks enables the motor tram-car to pass exceedingly-sharp curves without difficulty, except as to the slipping or grinding action of the traction-wheels on the track, due to the difference in length between the outer and inner rails at the curve. It is also possible at an extremely-short curve that the traction-wheels on the inner side of the truck may pass almost entirely off of the rail, as shown in Fig. 4.

To facilitate the passage of curves, I mount a small auxiliary wheel C' upon the truck at the position shown in Figs. 1 and 5, just within the main rail of the track and adapted to travel on an auxiliary rail in proximity to the main rail, for the purpose of slightly raising the traction-wheels from traction engagement with the track, yet leaving the flanges in guiding engagement, as shown in Fig. 5. By sustaining the weight of the truck on one side by the employment of the wheel C' the entire weight is supported at the three points $x$, $y$, and $z$, Fig. 4, one point being the small auxiliary wheel C' and the other two points being the traction-wheels on the other side of the truck. The axis of rotation of the small wheel being radial with the curve of the track and the speed of its rotation being independent of that of the traction-wheels on the opposite side of the truck, the truck passes easily around the curve without slipping of the wheels.

The gear-wheels M and N on the shafts C and W, I provide with radial openings between their teeth at the bases thereof for the ejectment of any dirt that may gather there. The gears themselves are supported on the wheels by a central flange and strengthened by the housings on the sides. This construction is shown in Figs. 8, 9, and 10, wherein Fig. 8 shows a section of the wheel through a tooth in the lower part of the figure and between two adjacent teeth in the upper part. A central flange 2 is shown in the figure with the teeth 3 cast thereon, and on each side of the teeth are housings 1, which aid in supporting the teeth and the broad faces of which engage in rolling contact with those on the opposing wheel, as shown in Fig. 2. Between the central flange and the housings and between each tooth is an opening, as indicated on one side by the line $h\ h$, which passes through it and shows its location. In Fig. 10 is seen a portion of the periphery of the wheel, and arrows $h\ h$, &c., show the openings between the teeth and between the housing and the central flange. These openings permit the ejection of any dirt that may gather between the teeth by the action of the teeth of the opposing wheel, which forces the dirt radially toward the center of the wheel and laterally through the openings.

In Figs. 1 and 6 is shown the brake device for use on my improved motor tram-car, and its construction is as follows: L L are two rocker-shafts passing through the frame, shown in the drawings as passing through the yoke of the field-magnets, which, however, is a matter of indifference so long as sufficient support is given to them. These rocker-shafts have gear-teeth cut on them at their outer ends and these engage with the vertically-disposed racks $u\ u$, attached to the brake-shoe U, which is adapted to press against the track when in use. L′ is a lever attached to one of the rocker-shafts L. Attached to each of the rocker-shafts L is the rocker-arm $l$ with the connecting-link $l'$ between them. By actuating the lever L′ rotation is given to the rocker-shaft L and is transmitted thence through the rocker-arms $l\ l$ and link $l'$ to the other rocker-shaft L, the rotations of the two rocker-shafts L being in opposite directions, and the gear-teeth on the rocker-shafts by their engagement with the racks $u\ u$ cause the brake-shoe U to be raised or lowered with great force and when lowered to press against the track and check the onward movement of the tram-car.

It will be observed that to check the onward movement of the tram-car and bring it and all its parts to rest there will be not only the momentum of the car in its onward path to be overcome, but also the momentum of the rotating parts and driving mechanism in their rotation. By the use of the brake which I have just described I may reduce the work in stopping the tram-car to that of overcoming the momentum of its forward movement only, since by the force with which I can press it against the track, there being one on each side, I can so reduce the traction of the wheels on the track that the rotating parts may continue in rotation without propulsion of the tram-car.

In the drawings, $l''\ l''$ are links having a circular bearing against the rocker-shafts L L and having their inner ends supported by the pin $u'$ in the middle elevated portion of the brake-shoe U. The object of these links is to sustain the strain of the rocker-shafts toward each other. The levers L′ may be operated by chains and hand-wheels located at any convenient part of the car.

In the drawings, Figs. 12, 13, 14, and 15 show detail views of the trolley connections between my improved motor tram-car and the external fixed conductors leading from the electric generator. H is the trolley-arm pivotally mounted upon a spindle inserted in a tube fixed to the motor tram-car. The spindle carries a downwardly-projecting arm $h'$, and the base of the trolley-arm carries a short outwardly-projecting arm $h''$, with a connecting-spring $s'$ between them for securing upward pressure of the outward end of the trolley-arm. The outer end of the trolley-arm has pivotally mounted thereon the cross-arm H′, Fig. 15, upon each end of which is a metallic thimble $t'$, provided with a spindle, upon each of which is mounted one of the trolley-wheels X X. Each of these trolley-wheels is provided with a single radial flange $x''$, which acts, in conjunction each with its own trolley-wire or fixed conductor Y Y, to guide the trolley-wheels and cause them to follow the lines of the conductor. The trolley-wheels are also provided with an axially-extending flange $x'$ and a hub $x'''$, Figs. 12 and 13. To the outer ends of the spindles of the metallic thimbles $t$ are the metallic yokes $y'$. These yokes serve both to retain the trolley-wheels X X on the spindles and to carry metallic brushes $y''$, Figs. 12 and 13, which press against the hub of the trolley-wheel and establish an elastically-supported sliding contact therewith, the advantage of which is to secure a more perfect contact under all circumstances between the sliding parts than could otherwise be obtained. The axial flange $x'\ x'$ sustains contact with the conductors Y Y, while the single radial flanges $x''$ serve in conjunction to guide the trolley-wheels on the conductors and yet admit of greater space for securing attachments to the fixed conductors for their support. I desire to call attention to the fact that this trolley device, having two single-flanged trolley-wheels, is adapted to press upward against the fixed conductors, making it of especial service when my improved motor-car is used in mines or the like, where the passage is of limited height, enabling me to place the fixed conductors at the extreme height of the passage, as far out of reach as possible. The pivotal attachment of the cross-arm H′ on the trolley-arm serves to permit the trolley-wheels to adapt themselves to possible inequalities in the relative heights of the conductors and to maintain constant contact therewith. Attached to the metallic thimbles $t'\ t'$ on the cross-arms H′ are the conductors $c'$, leading to and from the motor on the tram-car. These conductors are somewhat flexible at their connection with the thimbles to permit of the adjustment of the trolley-wheels, as hereinbefore described. These conductors have binding-terminals $c''$ attached to the trolley-arm for the insertion of a "fuse-wire" $c'''$.

The placing of the fuse-wire on the trolley-arm is of especial advantage in protecting every part of the electrical connections on the motor tram-car.

I claim and desire to secure by Letters Patent of the United States—

1. In a motor tram-car, the combination of the following elements: a motor and counter-shaft mounted on the car-frame, a power-transmitting device upon the counter-shaft, a truck supporting and tractionally connected to the car-frame through the counter-shaft, power-transmitting devices upon one or more axles of the truck, having surfaces which abut against similar surfaces on the device carried by the counter-shaft, whereby power is transmitted from the motor to the truck and draft is transmitted from the axles to the car-frame through the abutting-surfaces of the transmitting devices and the counter-shaft.

2. In a motor tram-car, pivotal trucks, axles mounted on the trucks, provided with traction-wheels, a shaft mounted upon the car, power-transmitting connections from the shaft to a motor, and a wheel mounted upon such shaft by a universal-joint connection in engaging contact with wheels mounted upon the axles of the truck, the arrangement being such that through the engagement of the wheels and connecting mechanism both power and draft may be transmitted between the truck and the car.

3. In a motor tram-car, the combination of the following elements: a motor and counter-shaft mounted on the car-frame and located between the axles of the truck, a power-transmitting device upon the counter-shaft, a truck supporting and tractionally connected to the car-frame through the counter-shaft, power-transmitting devices upon one or more axles of the truck, having surfaces which abut against similar surfaces on the device carried by the counter-shaft, whereby power is transmitted from the motor to the truck and draft is transmitted from the axles to the car-frame through the abutting surfaces of the transmitting devices and the counter-shaft.

4. In a motor tram-car, pivotal truck or trucks, axles mounted on the trucks, provided with traction-wheels, a shaft mounted upon the car, and a wheel mounted upon such shaft by a universal-joint connection in engaging contact with wheels mounted upon the axles of the truck, adapted by such engagement to control the plane of rotation of the universally-mounted wheel.

5. In a motor tram-car, pivotal truck or trucks, axles mounted on the trucks, provided with traction-wheels, a shaft mounted upon the car, a wheel mounted upon such shaft by a universal-joint connection in engaging contact with wheels mounted upon the axles of the truck, and devices upon such wheels adapted to maintain the universally-mounted wheel in alignment with the wheels upon the axles of the truck.

6. In a motor tram-car, pivotal truck or trucks, axles mounted upon the truck, provided with traction-wheels, a shaft mounted upon the car, power-driving connections from the shaft to a motor, a gear-wheel mounted upon the shaft by a universal-joint connection in engagement with gear-wheels mounted upon the axles of the truck, and housings upon the lateral sides of the gear-wheels in rolling contact, adapted to transmit draft between the truck and the car and to maintain the alignment of the gear-wheels.

7. In a motor tram-car, in combination with an auxiliary rail, an auxiliary wheel mounted upon the truck on one side thereof between the planes passing vertically through the axles of the truck and adapted by its travel upon the auxiliary rail to slightly raise the traction-wheels upon the side of the truck with the auxiliary wheel from traction-contact with the rail.

8. In a motor tram-car, a truck having axles and wheels mounted thereon, an auxiliary wheel mounted on the truck at one side between the axles and adapted to travel on an auxiliary rail in proximity to the main rail and to co-operate with the wheels on the other side of the truck to support the truck on three points only, substantially as shown, and for the purposes described.

9. In a motor tram-car, gear-wheels having a centrally-located radial flange for the support of the gear, teeth-housings on the lateral sides of the teeth, and radial openings between the teeth at their bases and between the central flange and the housings, substantially as shown, and for the purposes described.

10. In a motor tram-car, a trolley-arm carrying a conductor adapted to establish electric connection between the fixed conductors and the motor carried by the tram-car with a fuse-strip on the trolley-arm in circuit with the conductor thereon with binding connections for its insertion and removal.

11. In a motor tram-car, a motor supported on the car-frame and power-driving connections from the motor to the axles of the wheels, in combination with mechanism connected with the support of the axles of the wheels with reference to the car-frame, whereby the position of the axles or truck may be adjusted from one position to another upon the frame for varying or tightening the said power-driving connections.

12. In a motor tram-car, a truck connected to the car, so as to swing about a pivot, a pivot for such truck, consisting of two elements, viz: a rotating shaft and a universally-mounted wheel in engagement with each other, one engaging with the car-frame, the other with the truck, flanged wheels upon the truck, and a track co-operating therewith for the support and guidance of such truck.

ELMER A. SPERRY.

Witnesses:
ELMER E. JOHNSON,
W. R. GOODMAN.